(12) United States Patent
Hattori et al.

(10) Patent No.: US 11,506,865 B2
(45) Date of Patent: Nov. 22, 2022

(54) HONEYCOMB SANDWICH PANEL, OPTICAL DEVICE, AND ARTIFICIAL SATELLITE

(71) Applicant: Mitsubishi Electric Corporation, Tokyo (JP)

(72) Inventors: Tomoya Hattori, Tokyo (JP); Noboru Kawaguchi, Tokyo (JP); Toshitaka Nakaoji, Tokyo (JP); Atsumu Oikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/311,363

(22) PCT Filed: Dec. 12, 2019

(86) PCT No.: PCT/JP2019/048784
§ 371 (c)(1),
(2) Date: Jun. 7, 2021

(87) PCT Pub. No.: WO2020/122197
PCT Pub. Date: Jun. 18, 2020

(65) Prior Publication Data
US 2022/0026667 A1     Jan. 27, 2022

(30) Foreign Application Priority Data

Dec. 13, 2018    (JP) .............................. JP2018-233128

(51) Int. Cl.
*G02B 7/183*      (2021.01)
*B32B 3/12*      (2006.01)
(Continued)

(52) U.S. Cl.
CPC ................ *G02B 7/183* (2013.01); *B32B 3/12* (2013.01); *B32B 5/02* (2013.01); *B32B 15/14* (2013.01);
(Continued)

(58) Field of Classification Search
CPC ..... B32B 15/08; B32B 15/04; B32B 2250/03; B32B 2250/40; B32B 2262/106;
(Continued)

(56) References Cited

U.S. PATENT DOCUMENTS 9,354,421 B2    5/2016    Sekine et al.
2007/0243407 A1    10/2007    Delannay et al.
(Continued)

FOREIGN PATENT DOCUMENTS

JP      54-71939 U      5/1979
JP      10-82797 A      3/1998
(Continued)

OTHER PUBLICATIONS

Office Action dated Nov. 30, 2021, in corresponding U.S. Appl. No. 17/311,365, 23 pages.
(Continued)

*Primary Examiner* — Camie S Thompson
(74) *Attorney, Agent, or Firm* — Xsensus LLP

(57) ABSTRACT

A honeycomb sandwich panel having an absolute value of thermal expansion coefficient smaller than an absolute value of thermal expansion coefficient obtained by using carbon fiber reinforced plastic (CFRP) is provided. The honeycomb sandwich panel includes: a first skin being a plate material made of a low expansion metal being a metal having an absolute value of thermal expansion coefficient smaller than an absolute value of thermal expansion coefficient of CFRP; a second skin being a plate material made of the low expansion metal and arranged to face the first skin; and a
(Continued)

core made of CFRP or the low expansion metal, being bonded to the first skin and the second skin and including a plurality of tubular cells each having a hexagonal cross section, the tubular cells being formed adjacently to each other.

12 Claims, 10 Drawing Sheets

(51) Int. Cl.
  *B32B 5/02* (2006.01)
  *B32B 15/14* (2006.01)
  *B64G 1/10* (2006.01)
  *B64G 1/66* (2006.01)
  *G02B 7/00* (2021.01)
  *G02B 7/18* (2021.01)

(52) U.S. Cl.
  CPC ............... *B64G 1/10* (2013.01); *B64G 1/66* (2013.01); *G02B 7/008* (2013.01); *G02B 7/181* (2013.01); *B32B 2250/03* (2013.01); *B32B 2260/021* (2013.01); *B32B 2260/046* (2013.01); *B32B 2262/106* (2013.01); *B32B 2307/30* (2013.01); *B32B 2551/00* (2013.01)

(58) Field of Classification Search
  CPC ........ B32B 2260/021; B32B 2260/046; B32B 3/12; B32B 3/29; B32B 5/26; B29D 24/005; B29D 99/0089; B29C 70/222
  USPC ........... 428/116, 650; 359/883; 257/E23.109
  See application file for complete search history.

(56) References Cited

U.S. PATENT DOCUMENTS

| | | | |
|---|---|---|---|
| 2010/0086729 A1 | 4/2010 | Long | |
| 2015/0077874 A1 | 3/2015 | Naepflin et al. | |
| 2017/0090178 A1 | 3/2017 | Bullard et al. | |
| 2018/0345621 A1* | 12/2018 | Matsumoto | ............. C08L 77/02 |
| 2022/0026668 A1* | 1/2022 | Hattori | .................. G02B 7/181 |

FOREIGN PATENT DOCUMENTS

| | | | |
|---|---|---|---|
| JP | 11-14912 A | | 1/1999 |
| JP | 2005-28966 A | | 2/2005 |
| JP | 3902429 B2 | | 4/2007 |
| JP | 2012-185278 A | | 9/2012 |
| JP | 5574835 B2 | | 8/2014 |
| RU | 1775316 | * | 11/1992 |
| WO | 2006/021385 A1 | | 3/2006 |

OTHER PUBLICATIONS

Extended European search report dated Dec. 17, 2021, in corresponding European patent Application No. 19896831.5, 6 pages.
International Search Report and Written Opinion dated Feb. 25, 2020, received for PCT Application PCT/JP2019/048784, Filed on Dec. 12, 2019, 9 pages including English Translation.
Office Action dated Mar. 28, 2022, in corresponding German patent Application No. 112019005629.8, 13 pages.
Shinhokoku Steel Corporation, Zero Expansion Invar Alloy, Supporting Space-related Development Almost Zero Dimensional Change Over Time, Japan Metal Daily, Nov. 22, 2018, p. 3 Version 01 No.01.

* cited by examiner

HONEYCOMB SANDWICH PANEL, OPTICAL DEVICE, AND ARTIFICIAL SATELLITE

CROSS-REFERENCE TO RELATED APPLICATIONS

The present application is based on PCT filing PCT/JP2019/048784, filed Dec. 12, 2019, which claims priority to JP 2018-233128, filed Dec. 13, 2018, the entire contents of each are incorporated herein by reference.

TECHNICAL FIELD

The present disclosure relates to a honeycomb sandwich panel having a low thermal expansion coefficient, an optical device in which the honeycomb sandwich panel is used, and an artificial satellite on which the optical device is mounted.

BACKGROUND ART

A structural member of an optical device used in the field of aerospace or astronomical science, such as optical telescope, for example, is required to be lightweight and have a low thermal expansion coefficient. The structural member having a high thermal expansion coefficient may be deformed beyond an allowable extent due to a temperature change. The structural member deformed beyond the allowable extent due to heat may cause the optical axis of an optical telescope, for example, to deviate from a specified direction, or cause the focal position to deviate from a predetermined position. To orient the optical axis in the specified direction with high precision and fix the focal position at the predetermined position, the structural member of the optical telescope is required to have a low thermal expansion coefficient. Moreover, to increase the resolution of the optical telescope, it is necessary to increase the size of a reflecting mirror, for example. To restrict a weight increase as small as possible while increasing the size, the structural member is required to be lightweight.

A honeycomb sandwich panel is known as a structural member that has high stiffness and that is lightweight. The honeycomb sandwich panel includes a core having a honeycomb structure, and plate materials (skins) that sandwich the core therebetween. The honeycomb structure is a structure in which a plurality of tubular cells each having a hexagonal (which is desired to be regular hexagonal) cross section are arranged in parallel to each other without leaving unoccupied spaces. The skins arranged perpendicularly to the honeycomb structure are connected to the core.

The structural member of the optical device is required to be lightweight and have a low thermal expansion coefficient. In particular, an optical telescope mounted, for example, on an artificial satellite or spacecraft and to be used in space is required to have a thermal expansion coefficient of its structural member smaller than the thermal expansion coefficient of an optical telescope installed on earth. The reason for this is that the optical telescope to be used in space is subjected to a temperature change of more than 100 degrees between a condition of receiving sunlight and a condition of receiving no sunlight. To enable observation through the optical telescope to be conducted with required precision, it is necessary to restrict thermal deformation of the optical telescope within an allowable range (allowable extent). The magnitude of thermal deformation that is allowable for the optical device to achieve the same predetermined precision is the same on earth and in space. The optical device to be used in space where the optical device is subjected to a large temperature change is required to have a smaller thermal expansion coefficient of its structural member than a thermal expansion coefficient of the optical device installed on earth, in order to have thermal deformation substantially identical to thermal deformation of the optical device on earth.

Carbon fiber reinforced plastic (CFRP) is known as a material of lightweight and high stiffness. A honeycomb sandwich panel made of CFRP is proposed. In the honeycomb sandwich panel made of CFRP, its core and skins are both made of CFRP. It is proposed to divide the core into portions having different densities and directions, depending on the magnitude and/or the direction of load (see Patent Document 1). In order to have the isotropic thermal expansion coefficient that means that the thermal expansion coefficient is the same regardless of the direction, the core includes a plurality of tubular cells laid on each other and the wall between the cells has a uniform thickness (see Patent Document 2). The honeycomb sandwich panel made of CFRP has a thermal expansion coefficient of less than $10^{-6}$ [1/K].

A method is proposed to devise a specific direction in which carbon fibers for the core are weaved and/or a specific layer structure, in order to make CFRP to have a negative thermal expansion coefficient. It is also proposed to adjust the thermal expansion coefficient of the skins so as to make a thermal expansion coefficient of the whole honeycomb sandwich panel to cancel a positive and a negative (see Patent Document 3).

In order to support the reflecting mirror of the optical telescope with high precision, a complicated supporting mechanism is necessary. For example, a mirror supporting mechanism is known that is a combination of an axial supporting mechanism supporting the reflecting mirror in its optical axis direction and a lateral supporting mechanism supporting the reflecting mirror within a plane perpendicular to the optical axis, so that the mirror supporting mechanism supports the reflecting mirror in a condition that the whole reflecting mirror is appropriately constrained to have the six degrees of freedom for moving as a rigid body. The mirror supporting mechanism has a structure that can also deal with a relative difference in thermal expansion coefficient between the reflecting mirror and the mirror supporting mechanism (see Patent Document 4, for example).

CITATION LIST

Patent Literature

Patent Document 1: Japanese Patent No. 3902429
Patent Document 2: Japanese Patent Laying-Open No. 2005-028966
Patent Document 3: Japanese Patent No. 5574835
Patent Document 4: Japanese Patent Laying-Open No. 2012-185278

SUMMARY OF INVENTION

Technical Problem

As a structural member of an artificial satellite or of an optical device mounted on an artificial satellite, a honeycomb sandwich panel made of aluminum (abbreviated as Al in some cases) or CFRP is used.

Aluminum has low stiffness and low strength and has a high thermal expansion coefficient. Aluminum is therefore not suitable for the structural member of an optical device intended particularly to be used for optical observation. In contrast, CFRP has high stiffness and high strength and has a low thermal expansion coefficient. CFRP is more suitable for the structural member of the optical device than aluminum. CFRP is often used as a structural member of an optical device having the primary purpose of optical observation.

There is a demand for a honeycomb sandwich panel having an absolute value of thermal expansion coefficient smaller than an absolute value of thermal expansion coefficient achieved by using CFRP.

An object of the present disclosure is to obtain a honeycomb sandwich panel having an absolute value of thermal expansion coefficient smaller than an absolute value of thermal expansion coefficient achieved by using CFRP.

Solution to Problem

A honeycomb sandwich panel according to the present disclosure includes: a first skin being a plate material made of a low expansion metal, the low expansion metal being a metal having an absolute value of thermal expansion coefficient smaller than an absolute value of thermal expansion coefficient of carbon fiber reinforced plastic; a second skin being a plate material made of the low expansion metal and arranged to face the first skin; and a core made of carbon fiber reinforced plastic or the low expansion metal, the core being bonded to the first skin and the second skin and including a plurality of tubular cells each having a hexagonal cross section, the tubular cells being formed adjacently to each other.

Advantageous Effects of Invention

According to the present disclosure, a honeycomb sandwich panel having an absolute value of thermal expansion coefficient smaller than an absolute value of thermal expansion coefficient achieved by using CFRP can be obtained.

DESCRIPTION OF EMBODIMENTS

Embodiment 1

Figure 1:
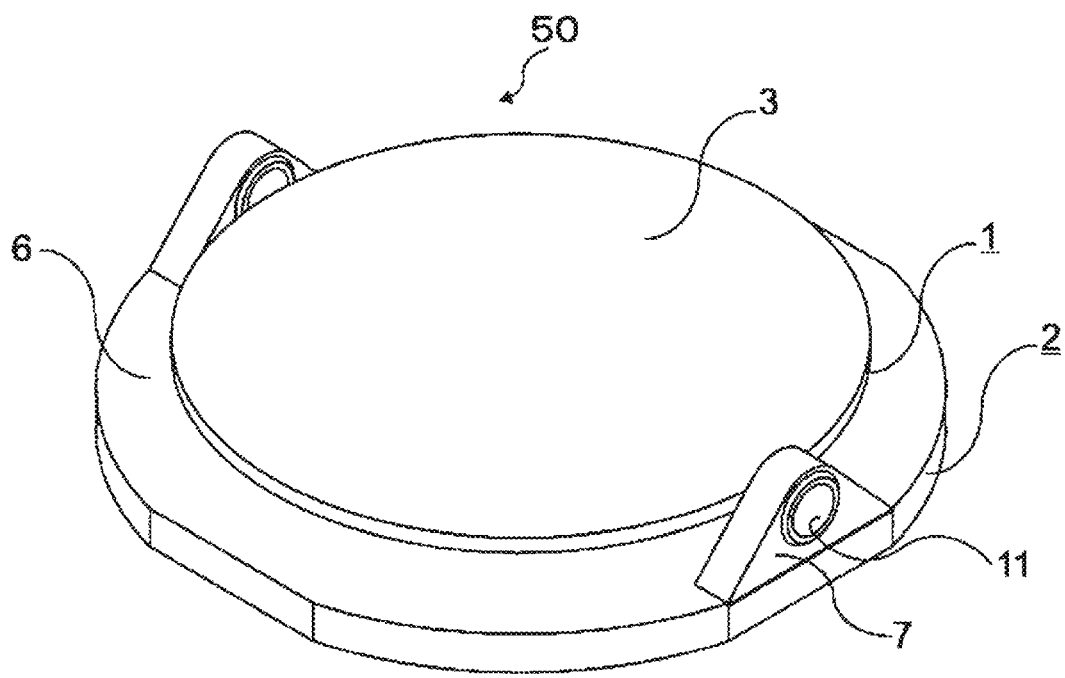
FIG. 1 is a perspective view of an optical device according to Embodiment 1.
Figure 2:
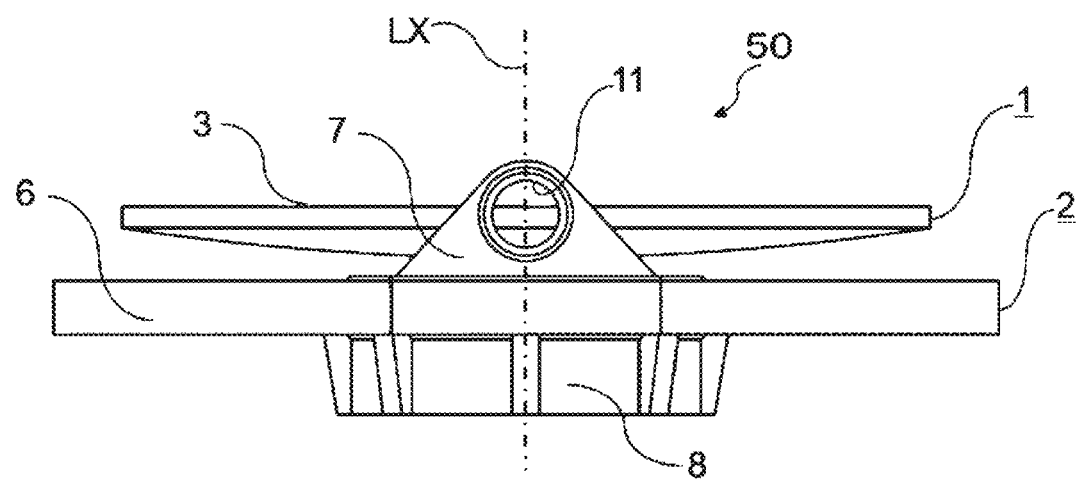
FIG. 2 is a front view of the optical device according to Embodiment 1.
Figure 3:
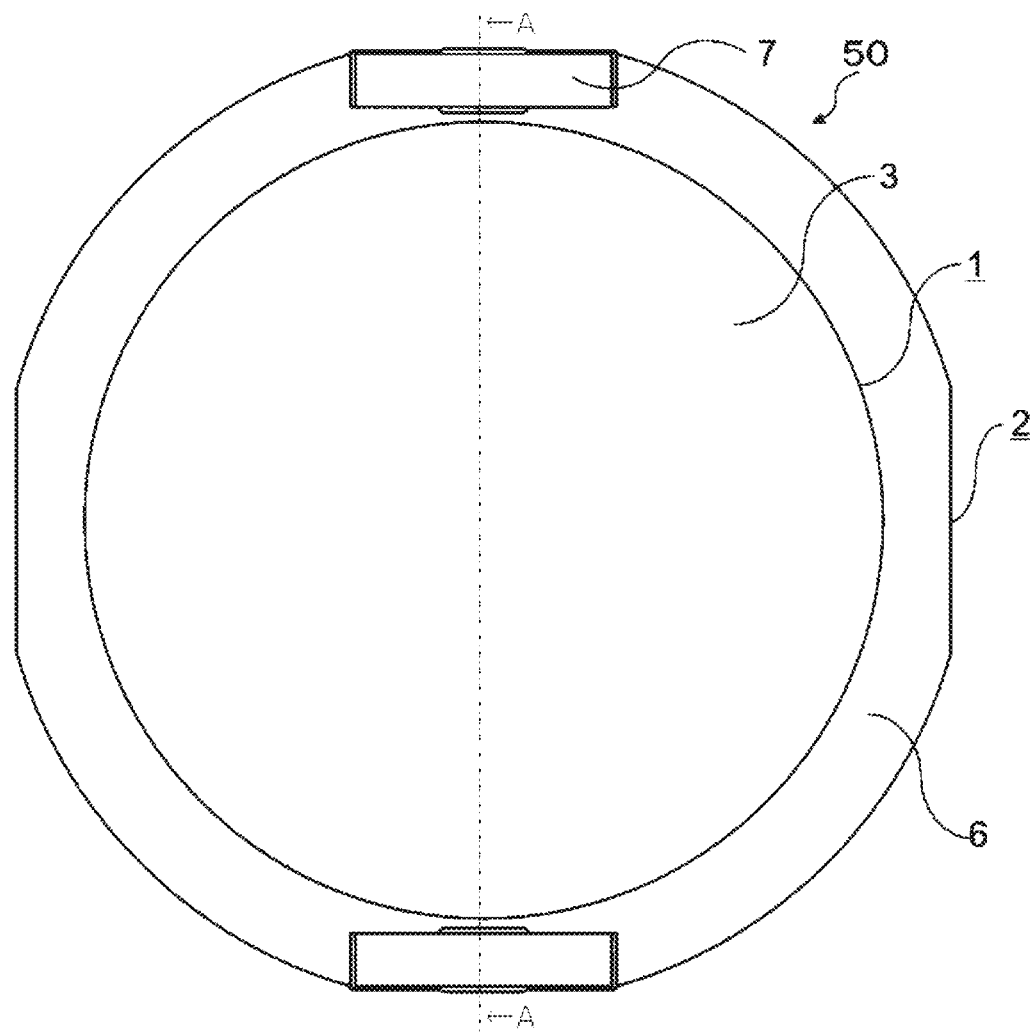
FIG. 3 is a plan view of the optical device according to Embodiment 1.
Figure 4:
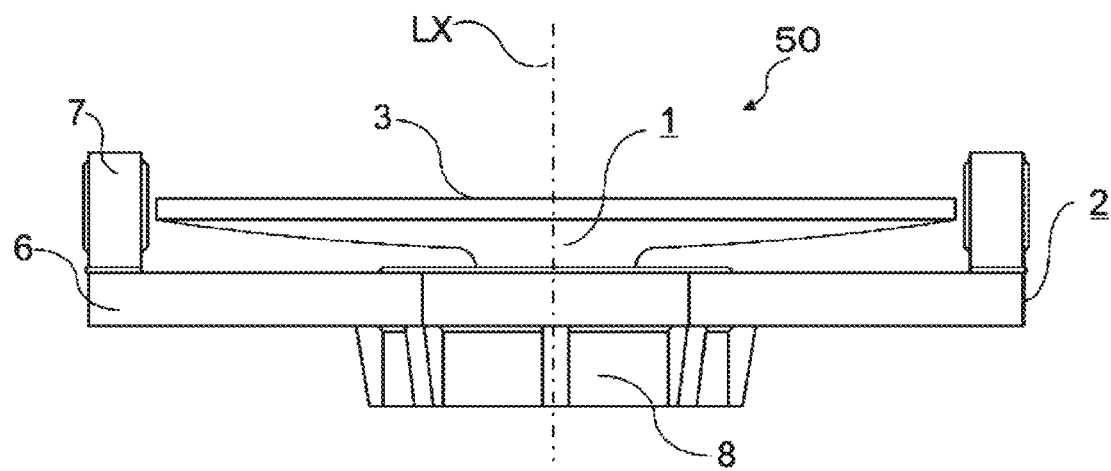
FIG. 4 is a right-side view of the optical device according to Embodiment 1.
Figure 5:
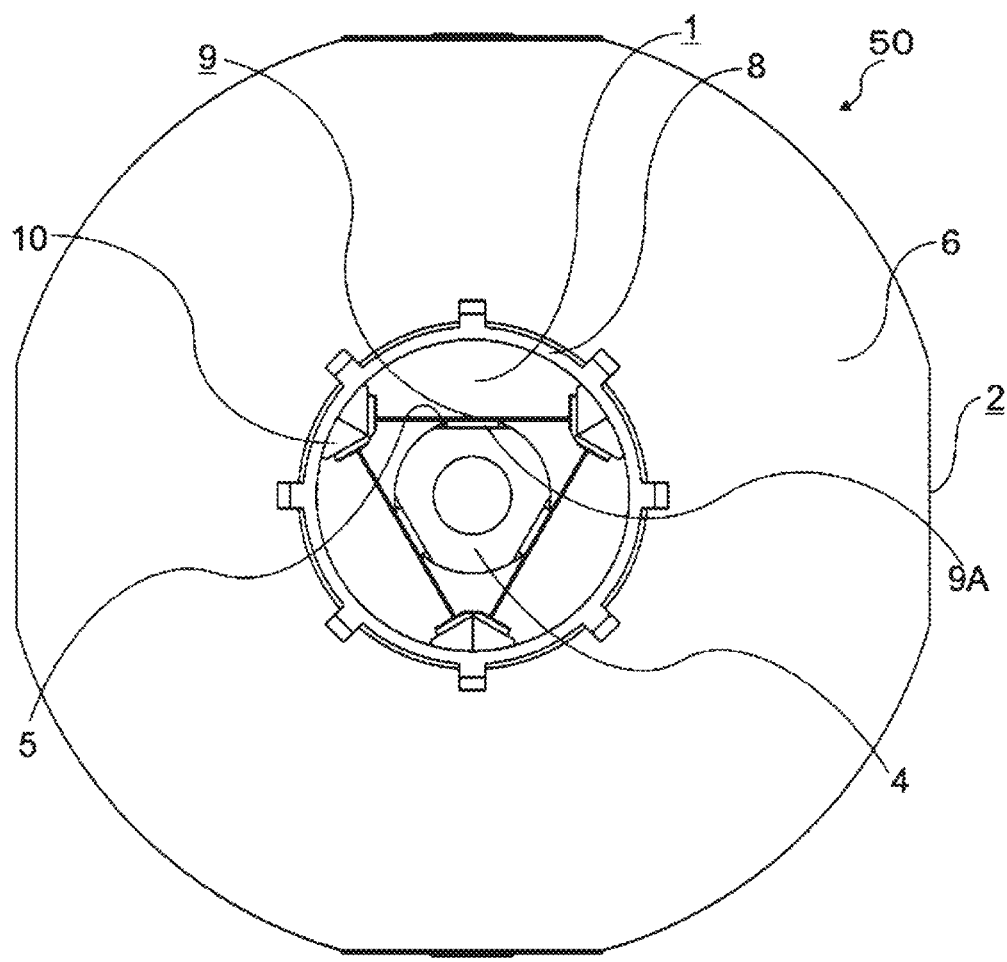
FIG. 5 is a bottom view of the optical device according to Embodiment 1.
Figure 6:
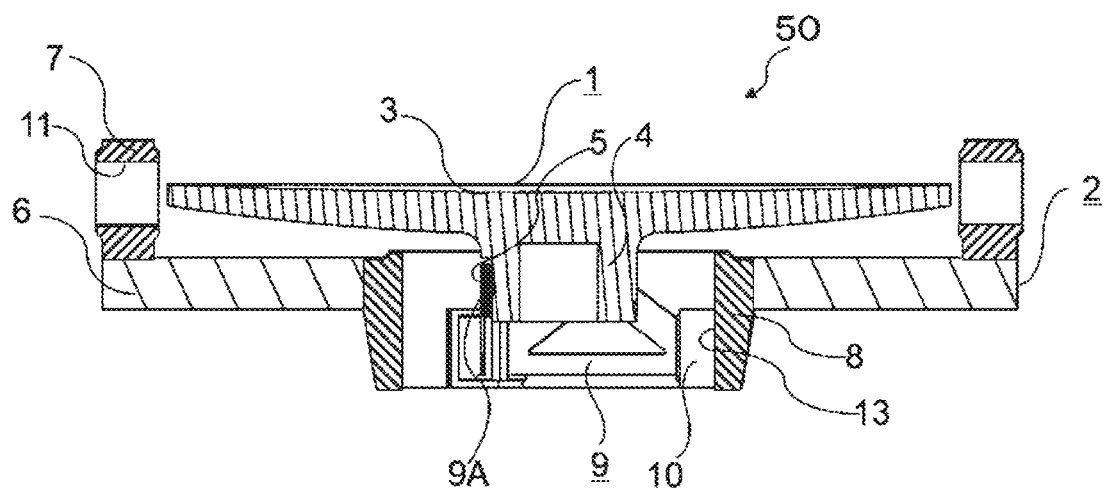
FIG. 6 is a cross-sectional view of the optical device according to Embodiment 1.

An optical device according to Embodiment 1 is described with reference to FIGS. 1 to 6. FIG. 1 is a perspective view of the optical device according to Embodiment 1. FIGS. 2 to 5 are a front view, a plan view, a right-side view, and a bottom view, respectively of the optical device. FIG. 6 is a cross-sectional view along an A-A cross section shown in FIG. 3. A reflecting mirror structure 50 which is an optical device includes a reflecting mirror 1 and a mirror supporting member 2. Reflecting mirror structure 50 is an optical telescope for observation of celestial bodies or the like. Mirror supporting member 2 is a member that supports reflecting mirror 1. Reflecting mirror 1 has a reflecting surface 3 that reflects observation light to be used for observation, and a supported portion 4 provided at the center of the rear surface that is a surface on the contrary side to the reflecting surface. Supported portion 4 is a member supported by mirror supporting member 2. Reflecting surface 3 is a concave surface having a circular contour. Supported portion 4 is a protrusion having a cylindrical outer shape. In an portion of the protrusion near an end, supported surfaces 5 that are three flat surfaces parallel to an optical axis LX (shown in FIGS. 2 and 4) of reflecting mirror 1 are provided. Supported surfaces 5 are rectangular flat surfaces of the same size forming an angle of 120 degrees therebetween. Supported portion 4 is rotationally symmetrical for every 120 degrees around optical axis LX. Mirror supporting member 2 is a structural member provided on the rear side of reflecting mirror 1. Reflecting mirror 1 and mirror supporting member 2 are also applicable to an optical instrument that is not used for observation.

Mirror supporting member 2 includes a supporting board 6, bearing parts 7, and a supporting opening portion 8. Mirror supporting member 2 includes a supporting beam 9 and a beam fixing portion 10. Supporting board 6 is a main body of mirror supporting member 2. Supporting board 6 is a panel-shaped member provided on the rear side of reflecting mirror 1. As seen in the direction of optical axis LX, supporting board 6 has a shape being formed with a circle being larger than reflecting mirror 1 and being cut linearly at left and right sides and upper and lower sides. The shape of supporting board 6 may also be expressed as a square with its four corners replaced with arcs. The ratio of each arc is approximately 35% of the length of one side of the square. Supporting board 6 has a surface existing on a side where reflecting mirror 1 exists, which is referred to herein as main surface, and has a surface existing on the contrary side to the main surface, which is referred to herein as rear surface. Each of bearing parts 7 is provided at a middle portion of each of two opposite sides of the main surface of supporting board 6. Bearing part 7 is shaped to protrude from the main surface. Bearing part 7 has a cylindrical shaft holding hole 11. Respective shaft holding holes 11 of two bearing parts 7 are provided to have a common central axis arranged to cross optical axis LX of reflecting mirror 1. The central axis of shaft holding holes 11 is parallel to the main surface of supporting board 6. Each of two columnar Y-axis shaft members 12 (not shown) is inserted in each of two shaft holding holes 11. Shaft holding holes 11 and Y-axis shaft members 12 have a common central axis. The central axis of Y-axis shaft members 12 is referred to herein as Y axis. Reflecting mirror structure 50 is rotatable around Y-axis shaft members 12, i.e., Y-axis.

Supporting opening portion 8, supporting beam 9, and beam fixing portion 10 are members for supporting supported portion 4 of reflecting mirror 1. Supporting opening portion 8 is a cylindrical opening portion provided at the center of the main surface of supporting board 6. Mirror supporting member 2 has supporting opening portion 8 that is provided with a hole in which supported portion 4 is contained. The hole provided in supporting opening portion 8 extends through supporting board 6. The inner surface surrounding the cylindrical opening space formed in supporting opening portion 8 is referred to herein as cylindrical surface 13. Cylindrical surface 13 is provided at a portion corresponding to disc-shaped supporting board 6 and a portion extending rearwards. Supporting opening portion 8 is a projection having an annular shape protruding from the rear surface of supporting board 6. The annular portion of supporting opening portion 8 protruding from the rear surface of supporting board 6 has eight reinforcing ribs extending in the direction from the central axis of cylindrical surface 13 to the outside and arranged at intervals having an equal angle.

Supported portion 4 of reflecting mirror 1 is put into a space surrounded by cylindrical surface 13. In the space surrounded by cylindrical surface 13, supported portion 4 is supported by three supporting beams 9. Six beam fixing portions 10 are provided on cylindrical surface 13. As seen in the direction of optical axis LX, beam fixing portion 10 has a substantially right-triangular shape having a vertex angle of 60 degrees and an arc instead of its base. Beam fixing portion 10 has a beam connected surface that is a flat surface parallel to optical axis LX, an arc surface being contacted with cylindrical surface 13, and a flat surface parallel to optical axis LX and being contacted with its adjacent beam fixing portion 10. The surface being contacted with adjacent beam fixing portion 10 and the beam connected surface form an angle of 60 degrees therebetween. One end of supporting beam 9 is connected to the beam connected surface.

Two beam fixing portions 10 are provided to be adjacent to each other. Two beam fixing portions 10 are connected to each other so that their arc surfaces form a continuous arc surface, and two beam fixing portions 10 are fixed at each of three positions of cylindrical surface 13. Respective ends of two supporting beams 9 are connected to respective two beam fixing portions 10 at each position. Respective beam connected surfaces of two beam fixing portions 10 form an angle of 120 degrees. Beam fixing portions 10 are provided to have rotational symmetry of 120 degrees around optical axis LX. Two beam fixing portions 10 among six beam fixing portions 10 are provided on cylindrical surface 13 at a position crossing the Y axis. Beam fixing portions 10 are provided on the rear side with respect to supported surface 5, in the direction of optical axis LX. One of the two ends of supporting beam 9 is connected to the beam connected surface of one of the two beam fixing portions 10 arranged on cylindrical surface 13 at an interval of 120 degrees, and the other end of supporting beam 9 is connected to the beam connected surface of the other of the two beam fixing portions 10.

In the space surrounded by cylindrical surface 13, supported portion 4 is supported by supporting beams 9, and therefore, mirror supporting member 2 can support reflecting mirror 1 with a shortened length of reflecting mirror structure 50 in the direction of optical axis LX. Alternatively, at the main surface side of supporting board 6 no supporting opening portion 8 is provided and, supported portion 4 may be supported by supporting beams 9.

Figure 7:
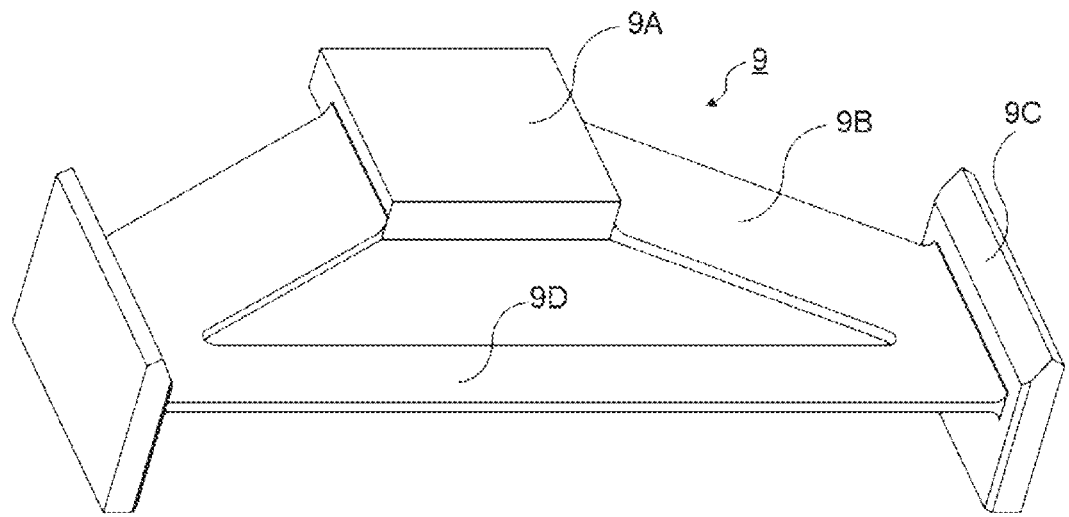
FIG. 7 is a perspective view of a supporting beam used for supporting a reflecting mirror in the optical device according to Embodiment 1.
Figure 8:
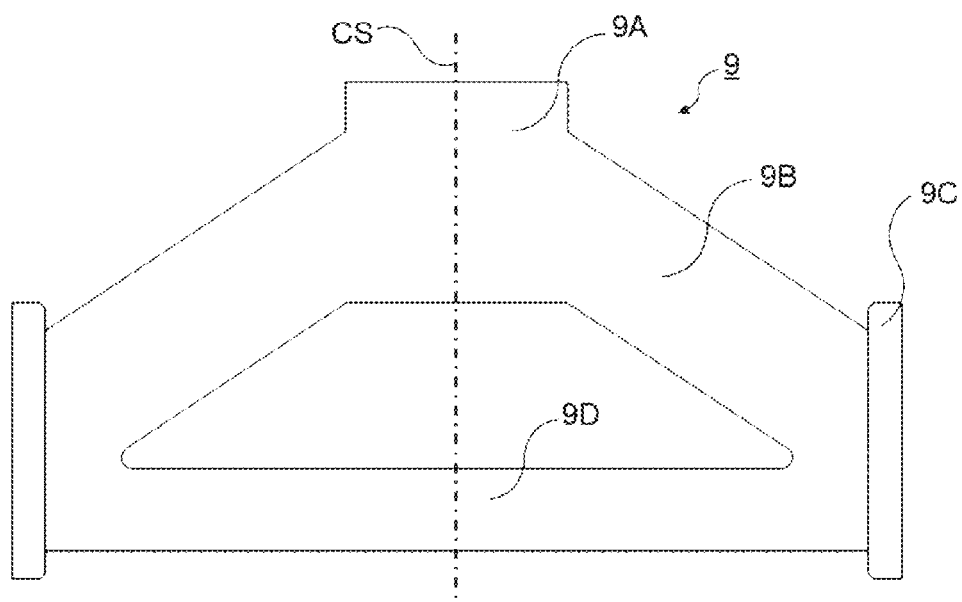
FIG. 8 is a front view of the supporting beam used for supporting the reflecting mirror in the optical device according to Embodiment 1.
Figure 9:
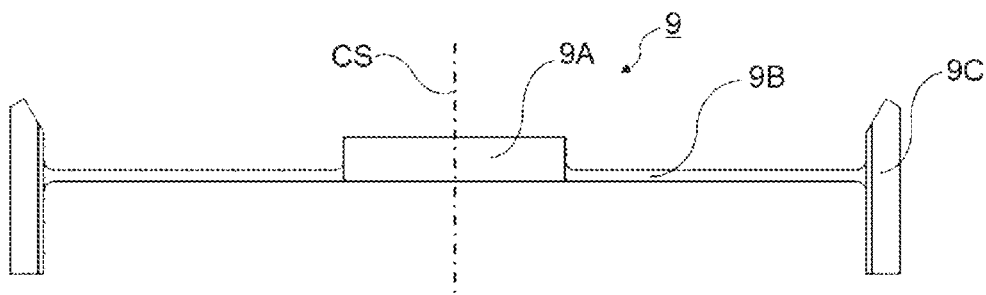
FIG. 9 is a plan view of the supporting beam used for supporting the reflecting mirror in the optical device according to Embodiment 1.
Figure 10:
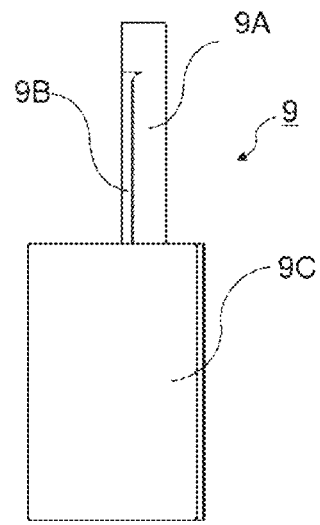
FIG. 10 is a right-side view of the supporting beam used for supporting the reflecting mirror in the optical device according to Embodiment 1.
Figure 11:
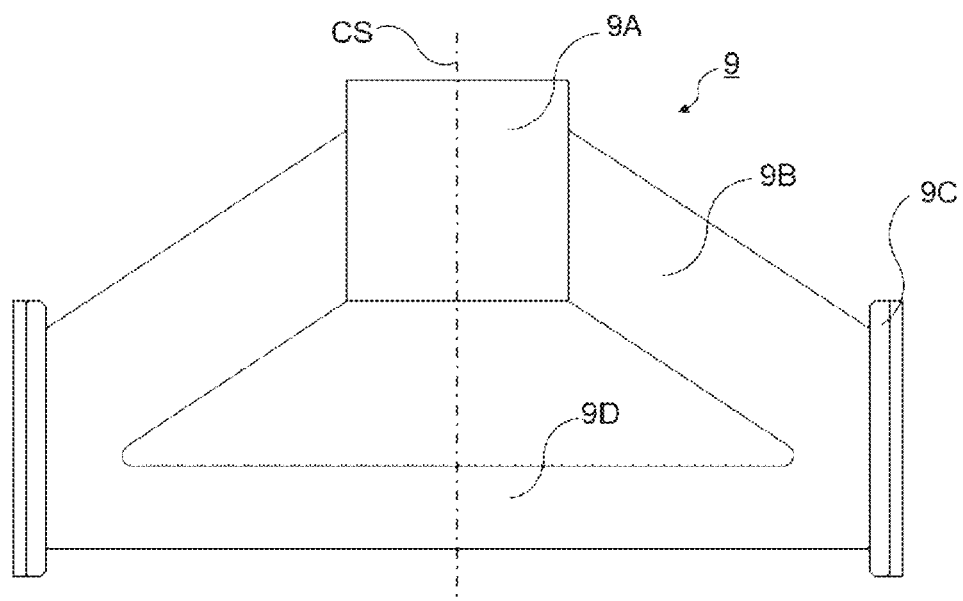
FIG. 11 is a rear view of the supporting beam used for supporting the reflecting mirror in the optical device according to Embodiment 1.
Figure 12:
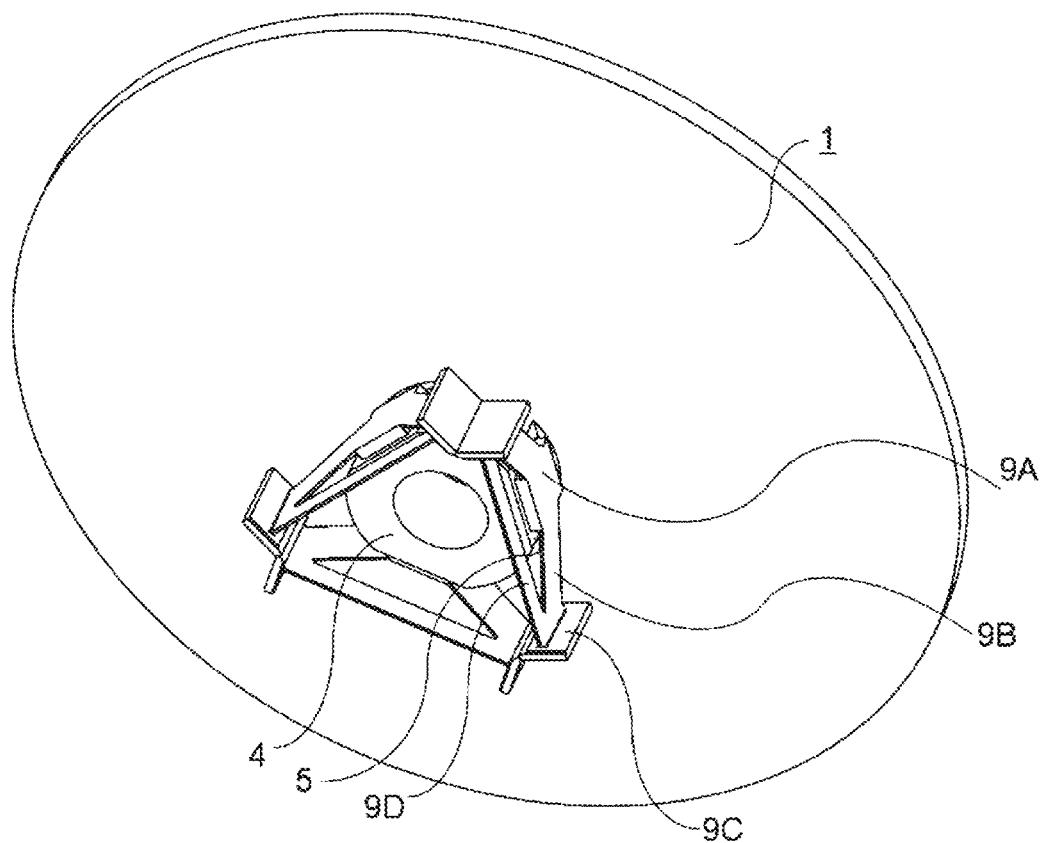
FIG. 12 is a perspective view of the reflecting mirror supported by the supporting beam in the optical device according to Embodiment 1.
Figure 13:
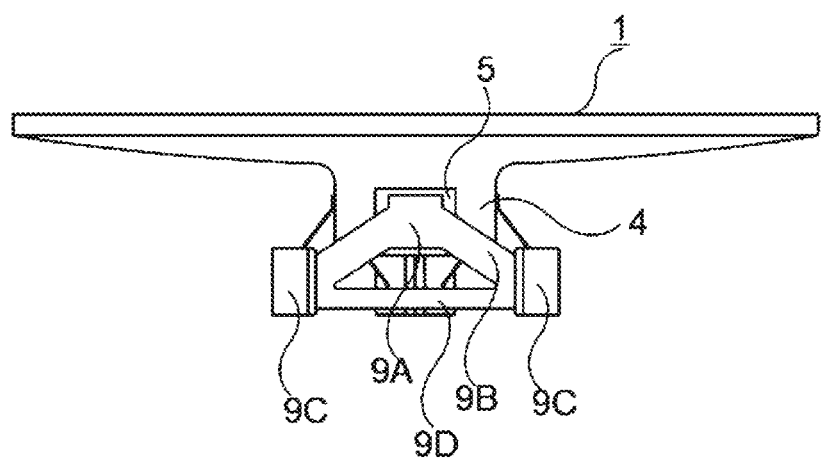
FIG. 13 is a front view of the reflecting mirror supported by the supporting beam in the optical device according to Embodiment 1.
Figure 14:
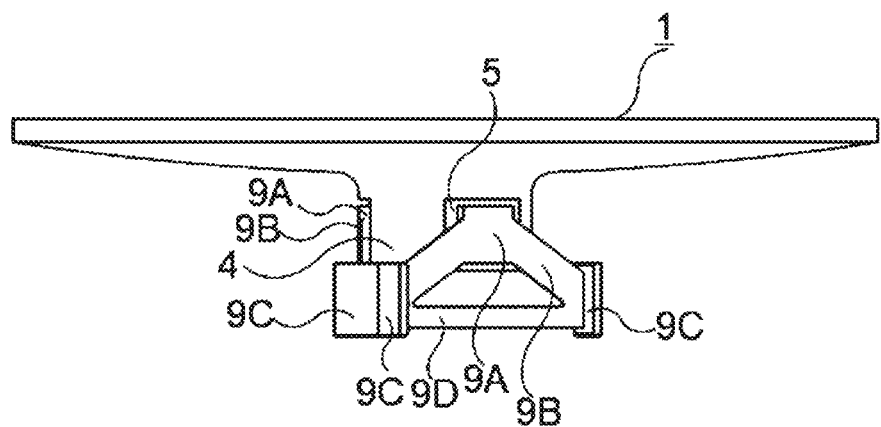
FIG. 14 is a right-side view of the reflecting mirror supported by the supporting beam in the optical device according to Embodiment 1.
Figure 15:
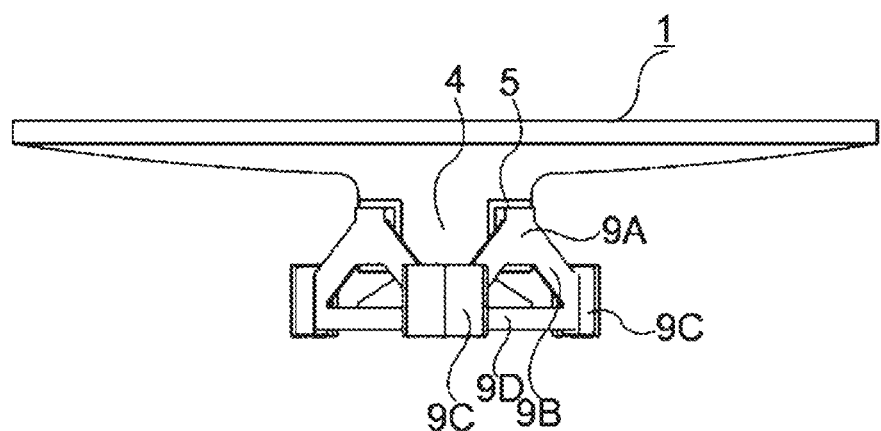
FIG. 15 is a rear view of the reflecting mirror supported by the supporting beam in the optical device according to Embodiment 1.
Figure 16:
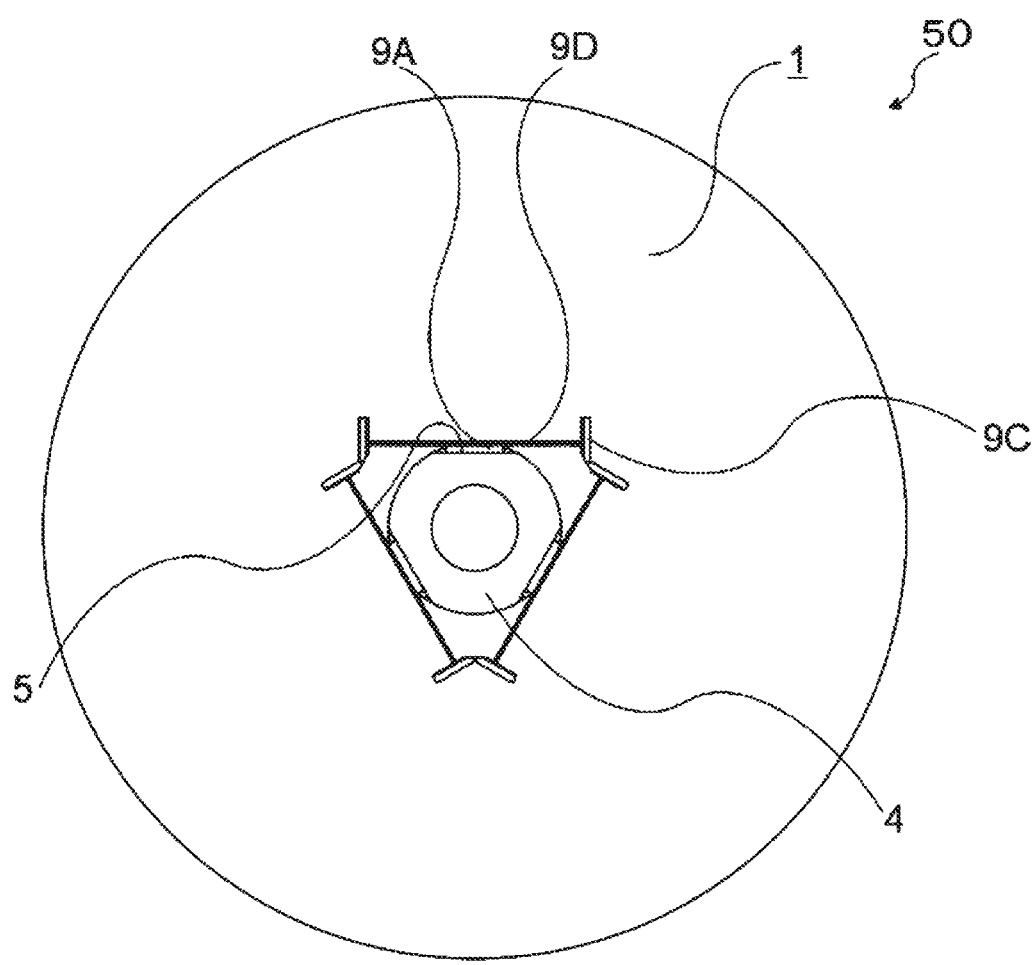
FIG. 16 is a bottom view of the reflecting mirror supported by the supporting beam in the optical device according to Embodiment 1.

A structure of supporting beam 9 is described with reference to FIGS. 7 to 11. FIG. 7 is a perspective view of supporting beam 9. FIGS. 8 to 11 are a front view, a plan view, a right-side view, and a rear view, respectively, of supporting beam 9. Supporting beam 9 has two ends connected to respective beam fixing portions 10, and a central portion connected to supported surface 5. Supporting beam 9 is shaped so that its main portion exists substantially on a plane. Supporting beam 9 has a portion bonded to supported surface 5 to support supported surface 5, and this portion is referred to herein as mirror supporting portion 9A. Mirror supporting portion 9A has a rectangular plate shaped. Mirror supporting portion 9A is fixed to supported surface 5 with adhesive. A beam portion 9B is connected obliquely to each of both sides of mirror supporting portion 9A. Beam portion 9B has a rectangular plate shape having a smaller width than mirror supporting portion 9A. Mirror supporting portion 9A is thicker than beam portion 9B. Mirror supporting portion 9A and beam portion 9B are connected to each other so that their surfaces existing relatively farther from supported surface 5 form a flat surface. Therefore, mirror supporting portion 9A protrudes from beam portion 9B toward supported surface 5. Two beam portions 9B are connected to mirror supporting portion 9A at an angle at which beam portions 9B are located farther from reflecting mirror 1 than mirror supporting portion 9A is located. Mirror supporting portion 9A existing relatively closer to the rear surface of reflecting mirror 1 is supported by beam portion 9B existing relatively farther from the rear surface. Supporting beam 9 is a supporting member including mirror supporting portion 9A and having its both ends connected to mirror supporting member 2 via beam fixing portions 10.

Beam portion 9B has an end to which mirror supporting portion 9A is not connected. A flange portion 9C in a rectangular plate shape is connected orthogonally to this end of beam portion 9B. Flange portion 9C is connected perpendicularly to beam portion 9B. Flange portion 9C is fixed to the beam connected surface of beam fixing portion 10.

Since two beam fixing portions 10 are arranged adjacently to each other, respective flange portions 9C of two supporting beams 9 are also adjacent to each other. Flange portion 9C with a substantially rectangular parallelepiped shape has a surface being contacted with adjacent flange portion 9C. The surface being contacted with adjacent flange portion 9C is formed by cutting away a portion, including a ridge, of the rectangular parallelepiped. The surface being contacted with adjacent flange portion 9C forms an angle of 120 degrees with the surface fixed to the beam connected surface. Thus, flange portions 9C are shaped so that they do not interfere with each other at respective ends where adjacent flange portions 9C being contacted each other.

In the vicinity of the joints of two beam portions 9B and flange portions 9C, a link portion 9D having a substantially rectangular plate shape is connected to two beam portions 9B. Link portion 9D, which is located farther from the rear surface of reflecting mirror 1 than mirror supporting portion 9A is located, couples one flange portion 9C to the other flange portion 9C. As seen from front, two beam portions 9B and link portion 9D appear to form a contour substantially in the shape of an isosceles triangle. Plate-shaped supporting beam 9 has appropriate elasticity. Supporting beam 9 can absorb a radial displacement of the portion where mirror supporting portion 9A supports supported surface 5 by being bent. The radial displacement is caused by a difference in thermal expansion coefficient between reflecting mirror 1 and mirror supporting member 2. Specifically, as supported portion 4 is expanded or contracted radially, supporting beam 9 can support supported portion 4, without applying excessive stress to supported portion 4. The radial direction of reflecting mirror 1 is the direction from optical axis LX toward the outer circumference, in a plane perpendicular to optical axis LX. As long as the portion where mirror supporting portion 9A supports supported surface 5 can be moved radially as supported portion 4 is expanded or contracted in the radial direction of reflecting mirror 1, beam portion 9B may not have a plate shape. For example, mirror supporting portion 9A may be made movable radially, by, for example, holding rotatably the both ends of a rod-like beam portion 9B. Supporting beam 9 may have a structure that allows mirror supporting portion 9A to move in the radial direction of reflecting mirror 1. Even when mirror supporting portion 9A is moved radially, the central position of supported portions 4 is fixed with respect to mirror supporting member 2.

Supporting beam 9 has plane symmetry with respect to a central plane CS that crosses mirror supporting portion 9A. Central plane CS crosses the center of rectangular mirror supporting portion 9A, perpendicularly to mirror supporting portion 9A. On the lower side of mirror supporting portion 9A as seen in the drawing, central plane CS crosses link portion 9D as if it divides link portion 9D into two parts. Two beam portions 9B have the same shape, and are connected similarly to respective positions, located symmetrically, of mirror supporting portion 9A. Two flange portions 9C have the same shape, and are connected to the same position of respective beam portions 9B at the same angle.

In the state where three supporting beams 9 support supported portion 4, optical axis LX of reflecting mirror 1 exists on respective central planes CS of these supporting beams 9. With respect to central plane CS of each of supporting beams 9, supporting beam 9 has plane symmetry and supporting beam 9, supported portion 4 and beam fixing portions 10 also have plane symmetry.

Reflecting mirror 1 supported by three supporting beams 9 is shown in FIGS. 12 to 16. FIGS. 12 to 16 are a perspective view, a front view, a right-side view, a rear view, and a bottom view, respectively, of reflecting mirror 1 supported by three supporting beams 9. As shown in FIGS. 12 to 16, reflecting mirror 1 is supported by a simple structure of three beams 9. Supported surfaces 5 and supporting beams 9 have rotational symmetry of 120 degrees around optical axis LX, and have plane symmetry with respect to central planes CS of supporting beams 9. Therefore, three supporting beams 9 can support supported portion 4 in such a manner that optical axis LX exists at the center of the regular triangle formed by three supporting beams 9. Supporting beam 9 may not have plane symmetry. Even when supporting beam 9 does not have plane symmetry, supported portion 4 and optical axis LX are arranged at respective predetermined positions through three supporting beams 9. Supporting beam 9 having plane symmetry makes it easier to arrange supported portion 4 and optical axis LX at respective predetermined positions.

Supporting opening portion 8, supporting beams 9, and beam fixing portions 10 constitute a mirror connecting portion that connects supported portion 4 to supporting board 6, with the position of supported portion 4 fixed with respect to supporting board 6.

Y-axis shaft member 12 is connected to an X-axis rotational member 14 (not shown). The X axis is orthogonal to the Y axis in a plane perpendicular to optical axis LX. X-axis rotational member 14 is rotatable around the X axis. X-axis rotational member 14 has a shape similar to the shape of supporting board 6. As seen in the direction of optical axis LX, X-axis rotational member 14 has a shape substantially similar to and slightly larger than supporting board 6. X-axis rotational member 14 supports Y-axis shaft member 12 by two protrusions provided on the main surface side of X-axis rotational member 14. On the rear side of the portion where bearing parts 7 are provided on the main surface side, the protrusions are connected to respective Y-axis shaft members 12 to support the respective Y-axis shaft members 12. The distance between the Y axis and X-axis rotational member 14 is determined appropriately so that reflecting mirror structure 50 is rotatable around the Y axis within a predetermined angle.

X-axis rotational member 14 is rotatable around the X axis by two X-axis shaft members 15 (not shown) parallel to the X axis. On the rear surface side of X-axis rotational member 14, a plate-shaped mirror base member 16 (not shown) having a protrusion supporting X-axis shaft member 15 is provided. The distance between mirror base member 16 and the X axis is determined appropriately so that X-axis rotational member 14 is rotatable around the X axis within a predetermined angle. Mirror base member 16 is fixed to a structural member of an optical telescope.

Supporting board 6 and bearing parts 7 are formed of a honeycomb sandwich panel 20 made of a metal having a low thermal expansion coefficient, so as to be lightweight and to have a low thermal expansion coefficient. As a metal having a low thermal expansion coefficient, invar alloy is used. For example, "Zero Thermal Expansion Invar" manufactured by Shinhokoku Steel Corporation has an extremely low thermal expansion coefficient of 0.06 ppm [1/K] (according to an article of Japan Metal Daily dated Nov. 22, 2018). A metal having an absolute value of thermal expansion coefficient smaller than an absolute value of thermal expansion coefficient of carbon fiber reinforced plastic (abbreviated as CFRP), even when the absolute value of thermal expansion coefficient is higher than the absolute value of thermal expansion coefficient of "Zero Thermal Expansion Invar," enables to provide an optical device with reduced influence of thermal expansion, as compared with using CFRP. A metal that is to be used for fabricating an optical device and has a lower thermal expansion coefficient than CFRP is referred to herein as low expansion metal. Supporting opening portion 8, supporting beam 9, and beam fixing portion 10 are made of the low expansion metal. At least any one of supporting opening portion 8, supporting beam 9, and beam fixing portion 10 may be made of a material different from the low expansion metal.

Figure 17:
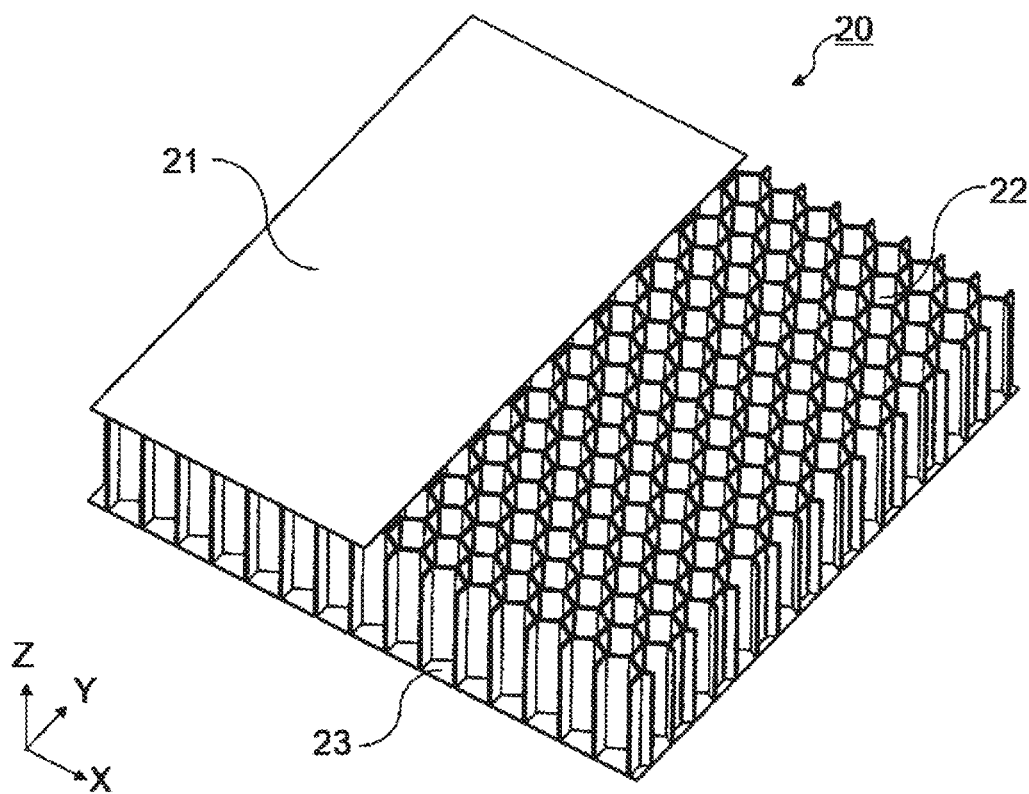
FIG. 17 is a perspective view of a honeycomb sandwich panel used in the optical device according to Embodiment 1, in a state in which a part of a skin of the panel is removed.

Referring to FIG. 17, a structure of honeycomb sandwich panel 20 is described. FIG. 17 is a perspective view of the honeycomb sandwich panel in a state in which a part of a skin is removed. Honeycomb sandwich panel 20 includes a first skin 21, a core 22, and a second skin 23. First skin 21 is a plate material forming one surface of honeycomb sandwich panel 20. Second skin 23 is a plate material forming the other surface arranged to face the one surface. In honeycomb sandwich panel 20 shown in FIG. 17, first skin 21 and second skin 23 are arranged in parallel to each other. Core 22 is a member having a honeycomb structure. The honeycomb structure is a structure in which a plurality of tubular cells each having a hexagonal (desired to be regular hexagonal) cross section are formed adjacently to each other. Core 22 is bonded perpendicularly to first skin 21 and second skin 23 with adhesive. Tubular cells each having a hexagonal cross section of which two opposite sides of the six sides have a different length from a length of the other four sides can be arranged in a plane without leaving uncovered area. The core may therefore have a shape in which tubular cells each having a hexagonal cross section are arranged adjacently to each other.

Mirror supporting member 2 is fabricated by using a honeycomb sandwich panel made of the low expansion metal. Accordingly, the degree of influence, on the position of reflecting mirror 1, of expansion or contraction caused by a temperature change can be reduced, compared to the mirror supporting member made of CFRP. Y-axis shaft member 12, X-axis rotational member 14, X-axis shaft member 15, and mirror base member 16 are also fabricated to include a honeycomb sandwich panel made of the low expansion metal, or are made of the low expansion metal.

Mirror supporting member 2 may be fabricated by using a honeycomb sandwich panel made of a material not being the low expansion metal, or may be fabricated without using a honeycomb sandwich panel. The same applied as well to each of Y-axis shaft member 12, X-axis rotational member 14, X-axis shaft member 15, and mirror base member 16.

The following problems that occur when CFRP is used can be solved by using the low expansion metal instead of CFRP.

A honeycomb sandwich panel for which CFRP is used varies in nature of stiffness and/or thermal expansion coefficient, depending on the direction of fibers and/or the layer structure. It is therefore necessary to consider and adjust the fiber direction and/or the layer structure before fabricating the skin and the core. As a result, a honeycomb sandwich panel made of CFRP requires more than a honeycomb sandwich panel made of the low expansion metal, in terms of at least one of effort, time, and cost.

In order to bond honeycomb sandwich panels both made of CFRP, or bond a honeycomb sandwich panel and another member, adhesive or insert is required to be used. It is therefore difficult for a honeycomb sandwich panel made of CFRP to increase bonding strength sufficiently.

The absolute value of thermal expansion coefficient that can be achieved by CFRP is less than $10^{-6}$ and approximately $3 \times 10^{-7}$ [1/K] or more. A low expansion glass material, for example, ZERODUR® Class 1 of Schott AG, has a thermal expansion coefficient of $0 \pm 0.05 \times 10^{-6}$ [K/1]. Compared to a reflecting mirror made of a low expansion glass material having a thermal expansion coefficient of less than $10^{-7}$ [1/K], the thermal expansion coefficient of CFRP that is a material to be made for the mirror supporting member is at least five times as high as the thermal expansion coefficient of the low expansion glass material of the reflecting mirror. When the mirror supporting member made of CFRP is used, a complicated structure is necessary to prevent deformation of the mirror supporting member made of CFRP from being transferred to optical elements.

To use CFRP for making an optical device to be used in space, there are some points to be considered. CFRP is a polymeric organic material and therefore is hygroscopic. If the optical device is launched into an orbit with CFRP containing moisture, the moisture may be evaporated in space to cause contraction deformation of CFRP. The organic component contained in CFRP may also be evaporated in space to cause contraction deformation. The contraction deformation of CFRP may cause the dimensions of the structural member to vary and cause the relative position of the optical instrument to be changed, resulting in deterioration of the observation accuracy. Gas containing the organic component generated from CFRP (outgas) may be brought into contact with the optical instrument and the organic component generated from CFRP may adhere to the optical instrument. Adhesion of the organic component may deteriorate the observation accuracy.

The low expansion metal has high stiffness and high strength, and has isotropy with respect to stiffness and thermal expansion. The low expansion metal has a higher thermal conductivity than CFRP.

Mirror supporting member 2 can be made of the low expansion metal such as "Zero Thermal Expansion Invar" to achieve a low thermal expansion coefficient of less than $10^{-7}$. Therefore, the difference in thermal expansion coefficient between the supporting structure and the reflecting mirror is small, and reflecting mirror 1 can be fixed to mirror supporting member 2 with three supporting beams 9. With the simple structure of supporting beams 9, optical instruments such as reflecting mirror 1 can be supported. The structure supporting the optical instruments can be made of the low expansion metal, to reduce the amount of deformation and the weight, as compared with using CFRP.

The low expansion metal can be processed through cutting, welding, or the like. Because the low expansion metal is a material that can be processed, it is unnecessary to take into consideration the fiber direction and/or the layer structure which must be considered for CFRP. Compared to fabricating an optical device using CFRP, fabricating an optical device with the low expansion metal can improve at least one of effort, time, and cost. As a connection method, welding providing higher strength than adhesive can be used for the low expansion metal. The low expansion metal is welded by a method that does not cause deformation of the honeycomb sandwich panel.

In the honeycomb sandwich panel, the first skin and the second skin may be made of the low expansion metal, and the core may be made of CFRP. For a honeycomb sandwich panel in which the first skin and the second skin are made of "Zero Thermal Expansion Invar" and the core is made of CFRP, deformation of the honeycomb sandwich panel with respect to a temperature change is simulated through finiteelement analysis. As to the shape of the honeycomb sandwich panel, each of the first skin and the second skin is a plate material having a length (Y direction) and a width (X direction) of 100 mm×100 mm and a thickness of 1 mm. The core had a cell size of about 6 mm, a thickness of the core cell wall of about 0.03 mm, and a height (Z direction) of 20 mm. The thermal expansion coefficient of "Zero Thermal Expansion Invar" is $5.0 \times 10^{-8}$ [1/K], and the thermal expansion coefficient of CFRP is $-3.0 \times 10^{-7}$ [1/K]. The temperature change is set to an increase of 10 [K].

As a result of the simulation, an X direction displacement and a Y direction displacement of $5.0 \times 10^{-5}$ [mm] and a Z direction displacement of $1.0 \times 10^{-5}$ [mm] are obtained to the honeycomb sandwich panel in which the first skin, the second skin, and the core are made of "Zero Thermal Expansion Invar." An X direction displacement of $4.92 \times 10^{-5}$ [mm], a Y direction displacement of $5.16 \times 10^{-5}$ [mm] and a Z direction displacement of $-8.28 \times 10^{-5}$ [mm] are obtained to the honeycomb sandwich panel in which the core is made of CFRP. The honeycomb sandwich panel in which the core is made of CFRP is deformed in a wavy shape, and therefore, the amount of displacement is measured at a portion having the largest displacement. This simulation result indicates that the honeycomb sandwich panel in which the first skin and the second skin are made of "Zero Thermal Expansion Invar" has, even when the core is made of CFRP, a thermal expansion coefficient in a plane parallel to the skins that is substantially identical to that of the honeycomb sandwich panel in which the skins and the core are made of "Zero Thermal Expansion Invar."

For supporting an optical instrument different from the optical instrument having the reflecting mirror, a honeycomb sandwich panel made of the low expansion metal can be used.

In reflecting mirror structure 50, mirror supporting member 2 supports supported portion 4 of reflecting mirror 1 by three supporting beams 9. This is 3-point support by three supporting beams 9, and accordingly, mirror supporting member 2 can support reflecting mirror 1 without overconstraint. Supported portion 4 is supported at three supported surfaces 5 in a point symmetrical manner with respect to optical axis LX. Supported portion 4 is supported by supporting beams 9 in a plane symmetrical manner with respect to central planes CS. Therefore, supporting beams 9 or mirror supporting member 2 does not hinder reflecting mirror 1 from expanding or contracting, which is caused by a temperature change, in a point symmetrical manner with respect to optical axis LX. Moreover, because of the difference in thermal expansion coefficient, even when supporting beams 9 and mirror supporting member 2 are expanded or contracted with respect to reflecting mirror 1, three supporting beams 9 are expanded or contracted similarly so that the stresses acting on reflecting mirror 1 at the three points are point symmetrical with respect to optical axis LX. Further, because supporting beams 9 are plane symmetrical with respect to respective central planes CS crossing the three points, the stresses acting on reflecting mirror 1 act on respective central planes CS. Respective stresses applied to reflecting mirror 1 by three supporting beams 9 have the same magnitude. As a result, expansion or contraction of mirror supporting member 2 does not cause the positions where reflecting mirror 1 is supported by three supporting beams 9 to be changed. When reflecting mirror 1 is expanded or contracted due to expansion or contraction of mirror supporting member 2, reflecting mirror 1 is expanded or contracted in a point symmetrical manner with respect to optical axis LX.

Supported portion 4 is provided near optical axis LX of reflecting mirror 1. Therefore, even when expansion or contraction occurs due to a temperature change, the amount of expansion or contraction of supporting beams 9 which support supported portion 4 can be made smaller than that when supported portion 4 is supported near the outer edge of reflecting mirror 1. Accordingly, the stress applied to reflecting mirror 1 and supporting beams 9 due to expansion or contraction is also made smaller. Supporting beams 9 and mirror supporting member 2 that are made of the low expansion metal enable further reduction of the amount of expansion or contraction as well as reduction of the stress. Even when the stress acting on supported portion 4 varies, the stress acts on the three points that exist close to each other, and therefore, the stress does not influence the mirror surface precision of reflecting surface 3 of reflecting mirror 1.

Thus, reflecting mirror structure 50 can deal with the relative difference in thermal expansion coefficient between reflecting mirror 1 and mirror supporting member 2, and reflecting mirror 1 is supported by a simpler structure of three supporting beams 9 than the conventional structure.

The supported surfaces may not be parallel to optical axis LX of reflecting mirror 1. The supported surfaces may not be flat surfaces. Each of supported surfaces may have a protrusion or recess. The supported surfaces may be provided at least to have rotational symmetry of 120 degrees around optical axis LX.

An optical telescope including reflecting mirror structure 50 can be mounted and used on an artificial satellite. When the artificial satellite on which the optical telescope is mounted is launched, the optical telescope and other parts are subjected to acceleration. Supporting beam 9 can support the reflecting mirror even under a situation in which acceleration is applied to. When the artificial satellite is launched, reflecting mirror 1 takes a posture with optical axis LX parallel to the direction of motion. Specifically, the acceleration when the artificial satellite is launched is generated in the direction parallel to optical axis LX of reflecting mirror 1. Beam portion 9B of supporting beam 9 is oblique to the direction in which acceleration is generated, so that stress against the acceleration can be generated by beam portion 9B.

The foregoing is also applied to other embodiments.

Embodiment 2

Figure 18:
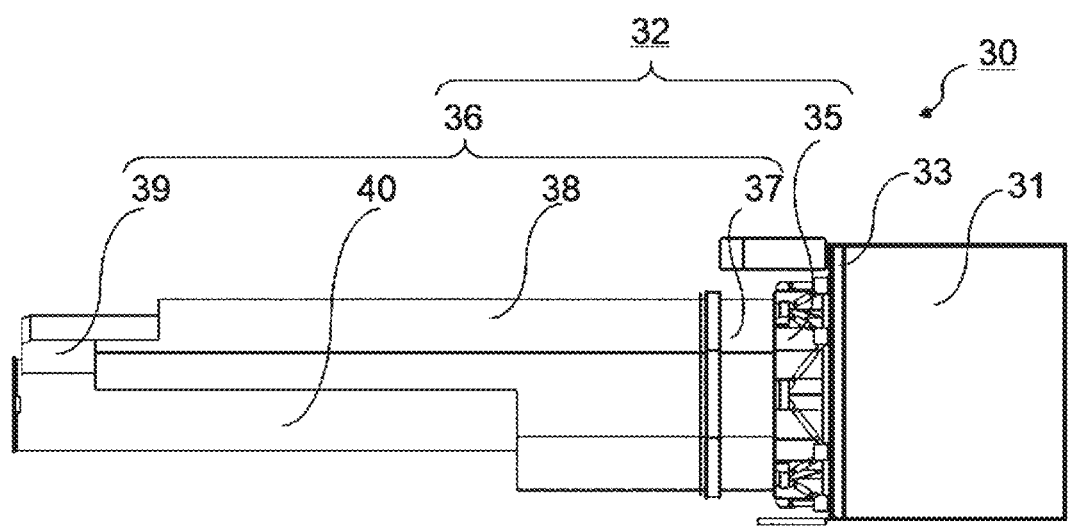
FIG. 18 is a front view of an artificial satellite on which an optical device is mounted according to Embodiment 2.
Figure 19:
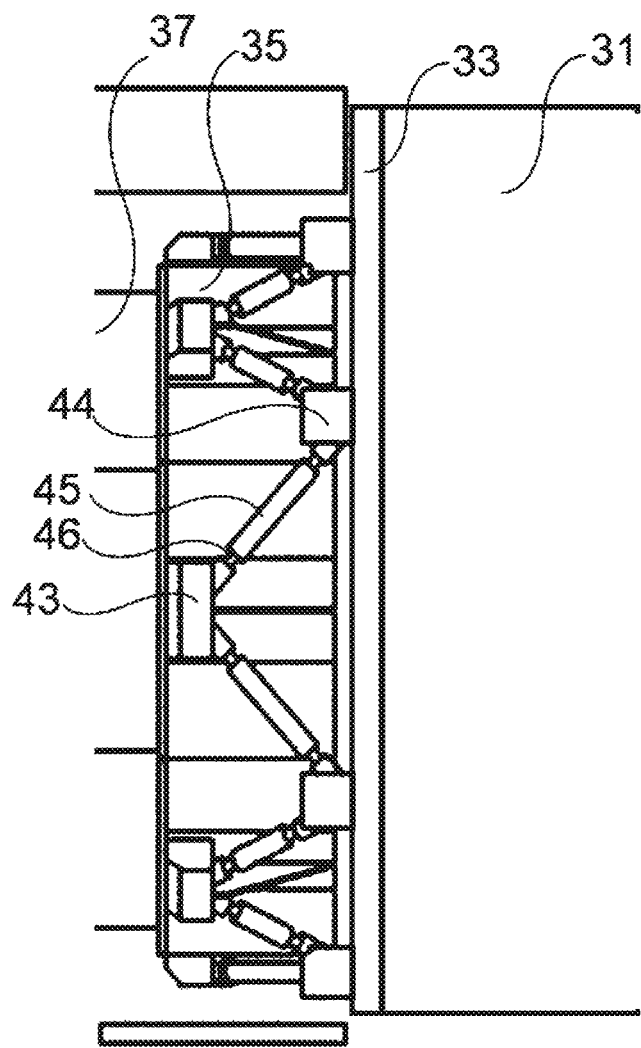
FIG. 19 is an enlarged view of a part where the optical device and the artificial satellite are connected to each other according to Embodiment 2.
Figure 20:
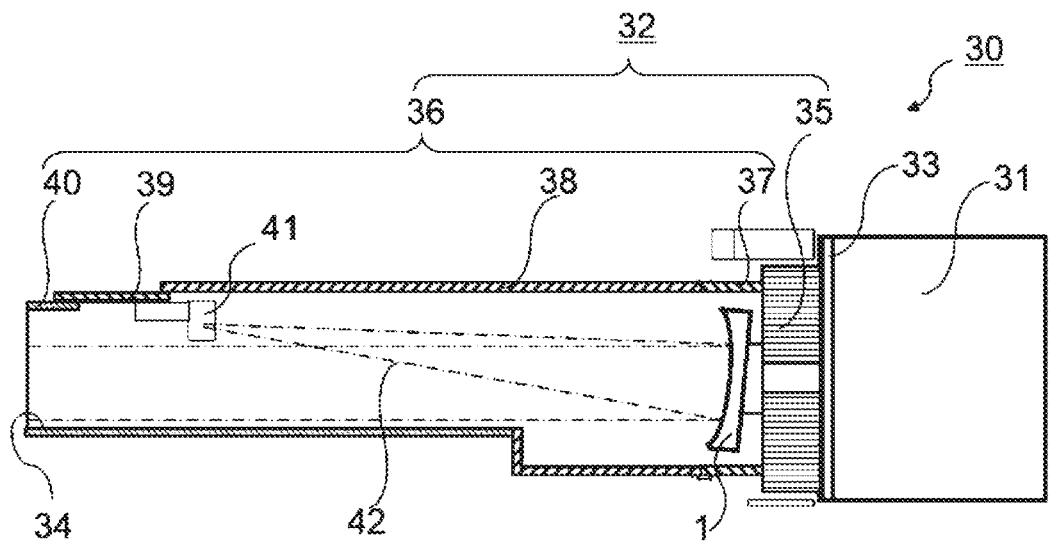
FIG. 20 is a conceptual cross-sectional view illustrating an internal configuration of the optical device according to Embodiment 2.

An artificial satellite on which an optical device is mounted according to Embodiment 2 is described with reference to FIGS. 18 to 20. FIG. 18 is a front view of the artificial satellite on which the optical device is mounted according to Embodiment 2. FIG. 19 is an enlarged view of a part where the optical device and the artificial satellite are connected to each other. FIG. 20 is a conceptual cross-sectional view illustrating an internal configuration of the optical device.

Artificial satellite 30 includes a satellite body 31 and an optical telescope 32. Optical telescope 32 is fabricated with consideration given so that a part(s) of the optical telescope that influences the observation accuracy has a low thermal expansion coefficient. Satellite body 31 is fabricated with no special consideration given to thermal expansion. Satellite body 31 includes a connecting panel 33 for mounting optical telescope 32 thereon. Connecting panel 33 is a flat plate-shaped member. Connecting panel 33 is fabricated by using a honeycomb sandwich panel made of metal such as aluminum.

Optical telescope 32 has a structure in which a circular entrance 34 (shown in FIG. 20) is provided at the side relatively farther from satellite body 31, and a reflecting mirror 1 is provided at the side relatively closer to satellite body 31. Regarding optical telescope 32, the side where entrance 34 exists is referred to herein as top side, and the side connected to satellite body 31 is referred to herein as bottom side. Optical telescope 32 is roughly divided into a base 35 and a lens barrel 36. Base 35 is provided on the bottom side and connected to connecting panel 33. Reflecting mirror 1 is mounted on base 35. Lens barrel 36 is a member surrounding an optical path 42 (shown in FIG. 20) in which observation light travels. Lens barrel 36 is connected at the bottom side to base 35.

Base 35 is in the shape of a disc having a through hole at the center. In the through hole, a line for transmitting an observed image to a memory provided inside satellite body 31, a signal line for transmitting a signal for controlling optical telescope 32, and the like, are passed. Base 35 is fabricated by using a honeycomb sandwich panel made of the low expansion metal. A supporting member of reflecting mirror 1 is fixed to base 35. Reflecting mirror 1 is supported on the supporting member so that the orientation of the optical axis can be changed.

Lens barrel 36 is connected perpendicularly to base 35. Lens barrel 36 includes a lens barrel bottom portion 37, a lens barrel middle portion 38, an instrument holding portion 39, and an optical path barrel portion 40. Lens barrel bottom portion 37 is in the shape of a polygonal tube having a smaller height compared to the width. The cross-sectional shape of lens barrel bottom portion 37 is a regular octagon. Lens barrel bottom portion 37 is fixed to base 35. Lens barrel bottom portion 37 has reflecting mirror 1 contained therein. Lens barrel bottom portion 37 has a flange at its top side. Lens barrel bottom portion 37 is fabricated by using a honeycomb sandwich panel made of the low expansion metal.

The bottom side of lens barrel middle portion 38 is a polygonal tube having a flange and a cross-sectional shape of a regular octagon. The top side of lens barrel middle portion 38 has a shape being only the upper half of the polygonal tube. As shown in FIG. 18, optical path barrel portion 40 is connected to the lower side and the top side, as seen in the drawing, of lens barrel middle portion 38. The top side of optical path barrel portion 40 is a cylinder. The top-side opening of the cylinder is entrance 34. The bottom side of optical path barrel portion 40 is only the lower half of the cylinder so that lens barrel middle portion 38 can be connected to the upper side. Lens barrel middle portion 38 and optical path barrel portion 40 are bonded to each other so that no gap is left therebetween. To the top side of the upper portion of lens barrel middle portion 38, instrument holding portion 39 is connected. Instrument holding portion 39 is provided on the upper side of optical path barrel portion 40 and the top side of lens barrel middle portion 38. Instrument holding portion 39 holds an optical instrument. Lens barrel middle portion 38 and instrument holding portion 39 are fabricated by using a honeycomb sandwich panel made of the low expansion metal. Optical path barrel portion 40 is made of aluminum.

Lens barrel bottom portion 37, lens barrel middle portion 38, instrument holding portion 39, and optical path barrel portion 40 are bonded to base 35 to form a closed space that allows observation light to enter only through entrance 34. In the closed space inside the lens barrel, an optical instrument is provided. In FIG. 20, only a slit 41 that disperses observation light is drawn. An optical instrument such as camera is also provided inside the lens barrel. Light entering from entrance 34 into the lens barrel is reflected by reflecting mirror 1. The light reflected by reflecting mirror 1 is dispersed by slit 41. Dispersed light having a specific wavelength enters the camera (not shown) and the camera captures an image of an object to be observed.

Optical path 42 is a path in which light travels from entrance 34 to slit 41. In FIG. 20, optical path 42 is indicated by a dot-dash line. It is desirable in the optical telescope that optical path 42 is kept to be the same regardless of the temperature. In optical telescope 32, base 35, lens barrel bottom portion 37, lens barrel middle portion 38, and instrument holding portion 39 are fabricated by using a honeycomb sandwich panel made of a low expansion metal having an absolute value of thermal expansion coefficient smaller than $1.0 \times 10^{-7}$ [1/K], or using a member made of the low expansion metal. It is therefore possible to restrict a change of the relative positional relation between reflecting mirror 1 and slit 41 to be small, even in a case where a temperature change occurs. As a result, a change of the focal position of optical telescope 32 can be kept within an allowable range, even in the case where the temperature change occurs. A change of the position of any optical instrument other than slit 41, with respect to reflecting mirror 1, can also be kept within an allowable range, even in the case where the temperature change occurs. As a result, a change of an image obtained for observation can be kept small, even in the case where the temperature change occurs. When a structural member supporting optical instruments such as reflecting mirror 1 and slit 41 is made of a material having a high thermal expansion coefficient, the distance between the optical instruments may be changed due to a temperature change, which may result in displacement of the focal position. The displacement of the focal position causes an image captured by a camera, for example, to be unclear. When a material having a high thermal expansion coefficient is used, an adjusting mechanism having a large stroke or the like may additionally be necessary, to keep the focal position unchanged. The honeycomb sandwich panel can reduce the weight, and can reduce the amount of energy required for launching artificial satellite 30 into space.

Optical telescope 32 which is an optical device includes a plurality of optical instruments and structural members supporting the optical instruments. Example of the optical instruments include reflecting mirror 1 and slit 41. Base 35 is a structural member supporting mirror supporting member 2. Mirror supporting member 2 is a structural member supporting reflecting mirror 1. Lens barrel 36 is a structural member that surrounds the optical path in which observation light travels, is connected to base 35, and supports slit 41. Lens barrel 36 supports an optical instrument(s) in addition to slit 41 (not shown).

Each of mirror supporting member 2, base 35, and lens barrel 36 includes a honeycomb sandwich panel made of the low expansion metal. In the path passing the structural members connecting reflecting mirror 1 to slit 41, there exist only the structural members made of the low expansion metal or fabricated by using honeycomb sandwich panels made of the low expansion metal. It is therefore possible to restrict a change of the relative positional relation between reflecting mirror 1 and slit 41 within an allowable range with respect to a temperature change. In the path between the optical instruments, a structural member made of a material other than the low expansion metal may be included. In the path of the structural member existing between optical instruments, the ratio of the honeycomb sandwich panel made of the low expansion metal or the ratio of a structural member made of the low expansion metal may be a predetermined lower limit or more. In the case of an optical device having three or more optical instruments, for all combinations each being a combination of two optical instruments selected from these optical instruments, the ratio of the honeycomb sandwich panel made of the low expansion metal or the ratio of a part made of the low expansion metal in the structural member existing in the path passing the structural member connecting one of the two optical instruments to the other of the two optical instrument, is determined to be a predetermined lower limit or more.

Base 35 is made of the low expansion metal, and connecting panel 33 is made of a metal having a higher thermal expansion coefficient than the thermal expansion coefficient of the low expansion metal. A structure absorbing a difference in amount of expansion or contraction between connecting panel 33 and base 35, due to a temperature change, is described. Base 35 is connected to connecting panel 33 by a supporting mechanism having rotational symmetry of 45 degrees with respect to its center. A rectangular parallelepiped protrusion 43 is provided at the center at the top side of each external surface of base 35 having an outer shape of a regular octagonal prism. Protrusion 43 is fixed to an extended portion of the skin of one surface of a honeycomb sandwich panel used to form base 35, and to a side surface of base 35. A prism-shaped protrusion 44 is provided also on connecting panel 33. One protrusion 43 and each of protrusions 44 on the both sides are connected by a single cylindrical rod 45. By two rods 45 connected to a single protrusion 43, this protrusion 43 is supported through a bipod structure (two legs). The surface of protrusion 43 to which one end of rod 45 is fixed is a surface perpendicular to the outer side surface of base 35. The other end of rod 45 is fixed to a side surface of protrusion 44. The side surface of protrusion 44 to which the other end of rod 45 is fixed is orthogonal to a plane in which rod 45 exists and which is parallel to the optical axis. As seen in the direction parallel to the optical axis, protrusion 44 has an outer shape of a trapezoid. The other end of rod 45 may be fixed to the upper surface of protrusion 44 (the surface existing on a side where protrusion 43 exists). Base 35 and connecting panel 33 are connected to each other by rods 45 only. A space is present between base 35 and connecting panel 33.

Each of eight protrusions 43 is connected to adjacent protrusions 44 by two rods 45. The total number of rods 45 is sixteen. The sixteen rods 45, the eight protrusions 43, and the eight protrusions 44 constitute an optical instrument connecting portion that connects optical telescope 32 to satellite body 31, allowing the position of optical telescope 32 with respect to satellite body 31 to be changed in response to a temperature change. Optical telescope 32 may be connected to satellite body 31, allowing the position of optical telescope 32 with respect to satellite body 31 to be changed in response to a temperature change, by a method other than the method using rods 45.

At the both ends of rod 45, reduced-diameter portions 46 having a relatively smaller diameter are provided. The portion of rod 45 sandwiched between reduced-diameter portions 46 is referred to herein as main body portion. Reduced-diameter portions 46 at the both ends have the same shape. In reduced-diameter portion 46, the cross section perpendicular to the axial direction of rod 45 is concentric and circular, and only the diameter decreases toward an end. In reduced-diameter portion 46, the diameter decreases to be a minimum diameter and then increases toward the end of rod 45. The presence of reduced-diameter portion 46 allows the angle at which rod 45 is connected to protrusion 43 to be changed and the angle at which rod 45 is connected to protrusion 44 to be changed. Thus, rods 45 can form a truss structure in which the angle at which the rod is connected is variable. Sixteen rods 45 form a truss structure. The number of rods may be larger or smaller than sixteen. The cross section of the lens barrel may not be octagonal.

The length of rod 45 is set to an appropriate length so that a space can be formed between base 35 and connecting panel 33 even in a case where a temperature change occurs. Base 35, connecting panel 33, protrusion 43, and protrusion 44 have sufficient strength not to be deformed in response to a temperature change. Reduced-diameter portion 46 of rod 45 is slightly bent with respect to the main body portion when a temperature change occurs. The material and/or the shape of rod 45 is determined so that rod 45 has required and sufficient strength for not being damaged when rod 45 is bent.

When heat is applied through irradiation with sunlight in space for example and accordingly the temperature increases, connecting panel 33 expands to a greater extent than base 35. Rod 45 is slightly bent at reduced-diameter portion 46, and the angle of the main body portion of rod 45 with respect to connecting panel 33 is decreased. When the temperature decreases, connecting panel 33 contracts to a greater extent than base 35. Rod 45 is slightly bent in the direction opposite to the direction in which rod 45 is bent upon temperature increase, and the angle of the main body portion of rod 45 with respect to connecting panel 33 is increased. In this way, rod 45 absorbs the difference in expansion or contraction amount due to the difference in thermal expansion coefficient between connecting panel 33 and base 35. When rod 45 is made of a material having a thermal expansion coefficient equal to or slightly smaller than the thermal expansion coefficient of connecting panel 33, rod 45 itself expands or contracts, so that the change of the angle at which rod 45 is bent at reduced-diameter portion 46 can be made smaller than that in the case where rod 45 is made of the low expansion metal.

The structural member supporting the optical instruments can be fabricated by using a honeycomb sandwich panel made of the low expansion metal, or fabricated by using a processed member made of a low expansion metal, to reduce the amount of change in relative positional relation between the optical instruments caused by a temperature change, as compared with the structural member made of CFRP. Change of the observation performance of an optical device such as optical telescope can be reduced, even if a temperature change occurs. Moreover, the optical device is not required to have a mechanism, such as focal position adjustment mechanism, for example, which is necessary for the optical device in the case where the structural member has a large absolute value of thermal expansion coefficient, and which prevents a change of the relative positional relation between optical instruments due to a temperature change, from affecting the observation accuracy.

The embodiments can be combined freely, or each embodiment can be modified and/or a part of the embodiment can be omitted.

REFERENCE SIGNS LIST 50 reflecting mirror structure (optical device);
1 reflecting mirror (optical instrument);
2 mirror supporting member (structural member);
3 reflecting surface;
4 supported portion;

5 supported surface;
6 supporting board (main body);
7 bearing part;
8 supporting opening portion (mirror connecting portion);
9 supporting beam (supporting member, mirror connecting portion);
9A mirror supporting portion (mirror connecting portion);
9B beam portion;
9C flange portion;
9D link portion;
10 beam fixing portion (mirror connecting portion);
11 shaft holding hole;
12 Y-axis shaft member;
13 cylindrical surface;
14 X-axis rotational member;
15 X-axis shaft member;
16 mirror base member;
20 honeycomb sandwich panel;
21 first skin;
22 core;
23 second skin;
30 artificial satellite;
31 satellite body;
32 optical telescope (optical device);
33 connecting panel;
34 entrance;
35 base (structural member);
36 lens barrel (structural member);
37 lens barrel bottom portion;
38 lens barrel middle portion;
39 instrument holding portion;
40 optical path barrel portion;
41 slit (optical instrument);
42 optical path;
43 protrusion (optical instrument connecting portion);
44 protrusion (optical instrument connecting portion);
45 rod (optical instrument connecting portion);
46 reduced-diameter portion;
LX optical axis;
CS central plane;

The invention claimed is:

1. A honeycomb sandwich panel comprising:
a first skin being a plate material made of a low expansion metal, the low expansion metal being a metal having an absolute value of thermal expansion coefficient smaller than an absolute value of thermal expansion coefficient of carbon fiber reinforced plastic, the absolute value of thermal expansion coefficient of the low expansion metal being less than $3 \times 10^{-7}$ [1/K];
a second skin being a plate material made of the low expansion metal and arranged to face the first skin; and
a core made of carbon fiber reinforced plastic or the low expansion metal, the core being bonded to the first skin and the second skin and including a plurality of tubular cells each having a hexagonal cross section, the tubular cells being formed adjacently to each other.

2. The honeycomb sandwich panel according to claim 1, wherein the absolute value of thermal expansion coefficient of the low expansion metal is less than $10^{-7}$ [1/K].

3. The honeycomb sandwich panel according to claim 1, wherein the core is made of the low expansion metal.

4. The honeycomb sandwich panel according to claim 1, wherein the first skin and the second skin are arranged in parallel to each other, the core is arranged to be bonded perpendicularly to the first skin and the second skin, and the core includes a plurality of regular hexagonal tubular cells being formed adjacently to each other.

5. An optical device comprising:
a reflecting mirror to reflect light; and
a mirror supporting member supporting the reflecting mirror and including the honeycomb sandwich panel according to claim 1.

6. The optical device according to claim 5, wherein
the reflecting mirror includes a supported portion disposed on a rear surface, the supported portion being supported by the mirror supporting member, the rear surface being a surface of the reflecting mirror existing on the contrary side to a reflecting surface to reflect light,
the mirror supporting member includes: a main body provided on a rear side of the reflecting mirror; and a mirror connecting portion connecting the supported portion to the main body and fixing a position of the supported portion with respect to the main body.

7. An artificial satellite comprising:
a satellite body;
the optical device according to claim 5; and
an optical instrument connecting portion connecting the optical device to the satellite body, the optical instrument connecting portion allowing a position of the optical device with respect to the satellite body to be changed in response to a temperature change.

8. The artificial satellite according to claim 7, wherein the optical instrument connecting portion includes a plurality of rods that form a truss structure.

9. An optical device comprising:
a plurality of optical instruments; and
a structural member supporting the plurality of optical instruments and including the honeycomb sandwich panel according to claim 1, wherein
for all combinations each being a combination of two optical instruments selected from the plurality of optical instruments, a ratio of the honeycomb sandwich panel or a ratio of a part made of the low expansion metal in the structural member existing in a path passing the structural member from one of the two optical instruments to the other of the two optical instruments, is a predetermined lower limit or more.

10. The optical device according to claim 9, comprising:
a reflecting mirror being one of the plurality of optical instruments to reflect observation light to be used for observation;
a mirror supporting member being the structural member supporting the reflecting mirror;
a base being the structural member supporting the mirror supporting member; and
a lens barrel being the structural member surrounding an optical path in which the observation light travels, being connected to the base, and supporting another one of the plurality of optical instruments.

11. The honeycomb sandwich panel according to claim 1, wherein the low expansion metal is invar alloy.

12. A honeycomb sandwich panel comprising:
a first skin being a plate material made of a low expansion metal, the low expansion metal being a metal having an absolute value of thermal expansion coefficient smaller than an absolute value of thermal expansion coefficient of carbon fiber reinforced plastic;
a second skin being a plate material made of the low expansion metal and arranged to face the first skin; and
a core made of the low expansion metal, the core being bonded to the first skin and the second skin and including a plurality of tubular cells each having a hexagonal cross section, the tubular cells being formed adjacently to each other.

* * * * *